July 17, 1956     R. L. CRANE     2,754,567
AUTOMATIC FEED CONTROL APPARATUS FOR MACHINE TOOLS
Filed July 30, 1953     4 Sheets-Sheet 1
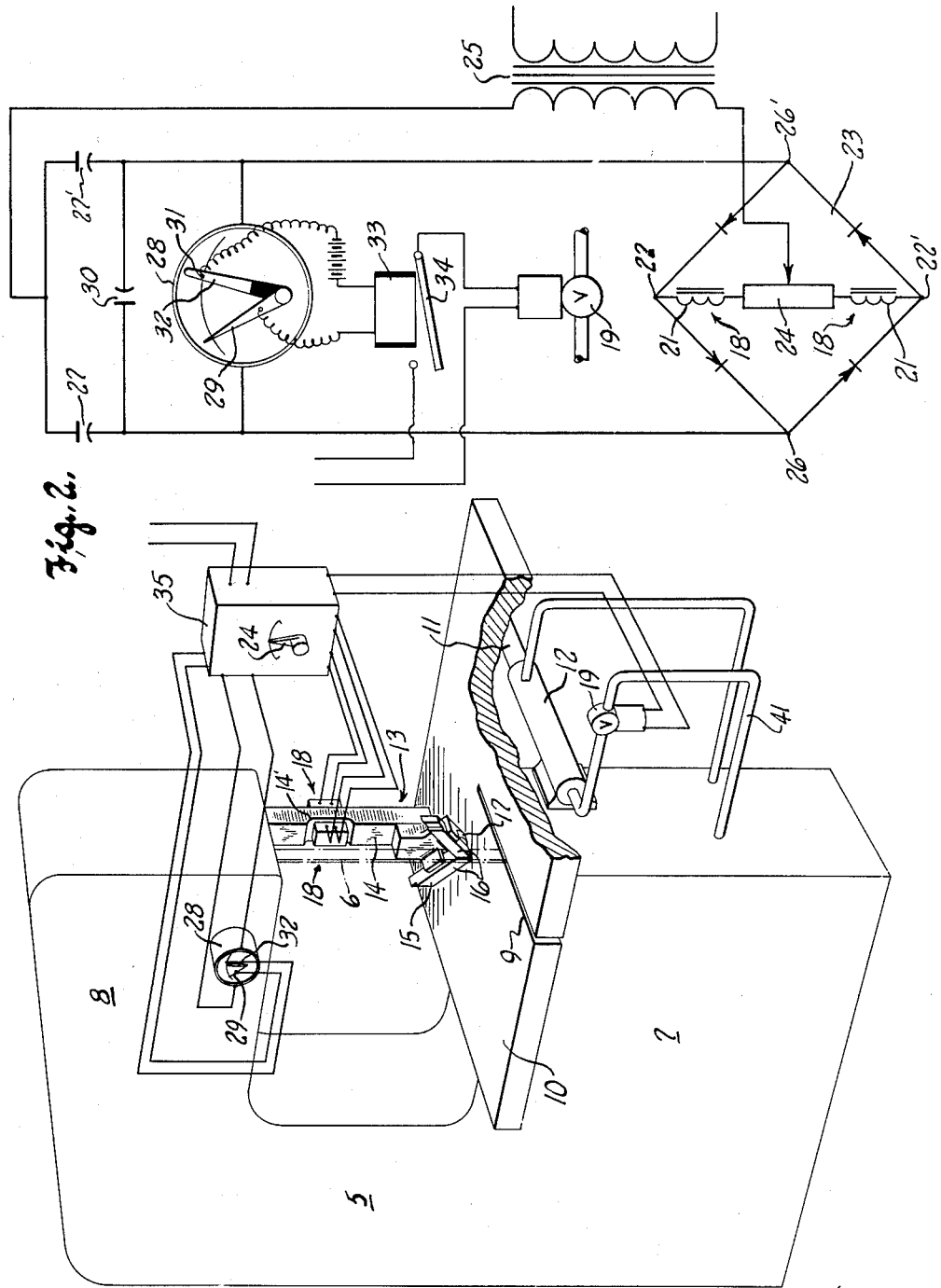
Inventor
Robert L. Crane July 17, 1956 R. L. CRANE 2,754,567
AUTOMATIC FEED CONTROL APPARATUS FOR MACHINE TOOLS
Filed July 30, 1953 4 Sheets-Sheet 2

Inventor
Robert L. Crane

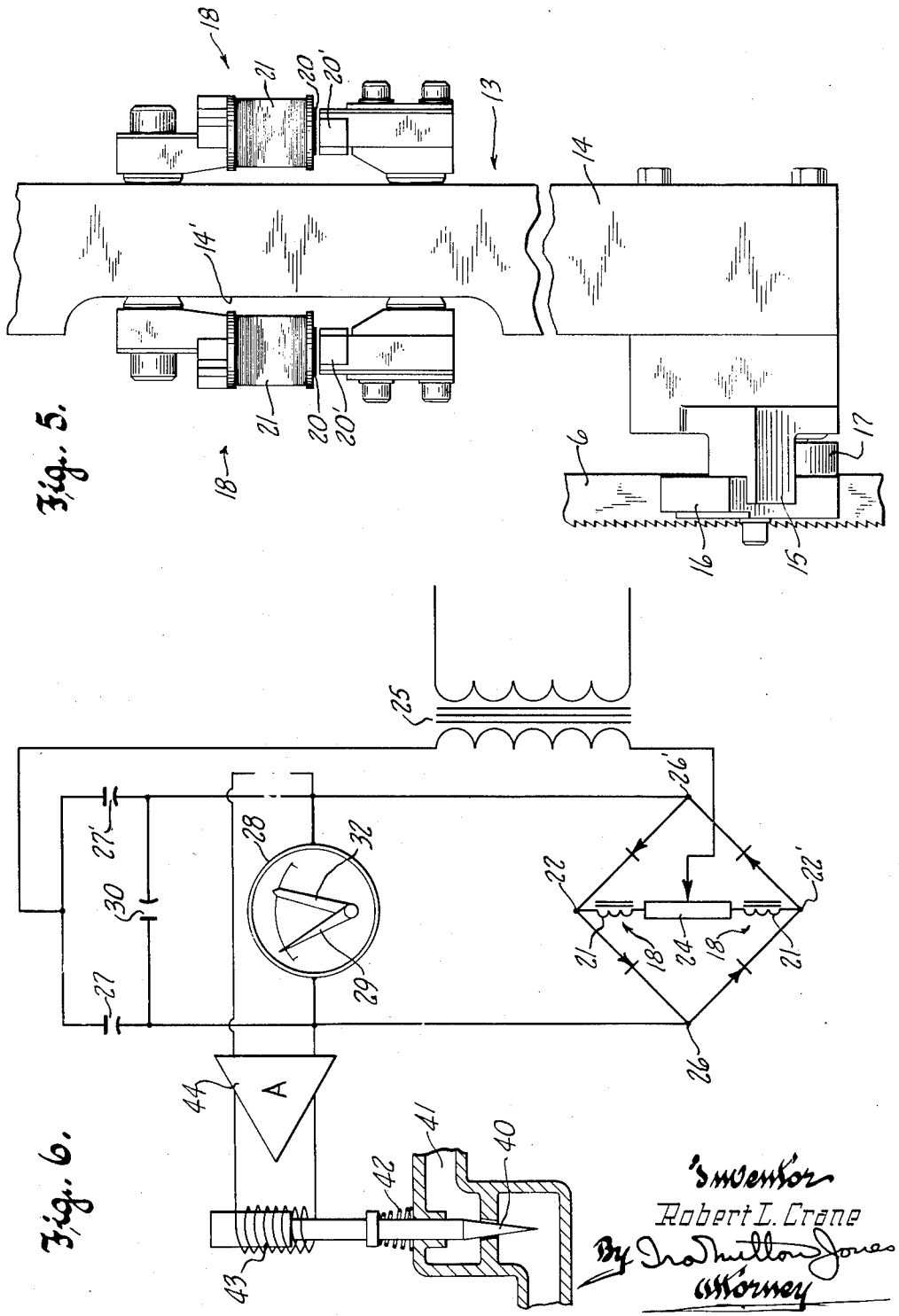

July 17, 1956 R. L. CRANE 2,754,567
AUTOMATIC FEED CONTROL APPARATUS FOR MACHINE TOOLS
Filed July 30, 1953 4 Sheets-Sheet 4
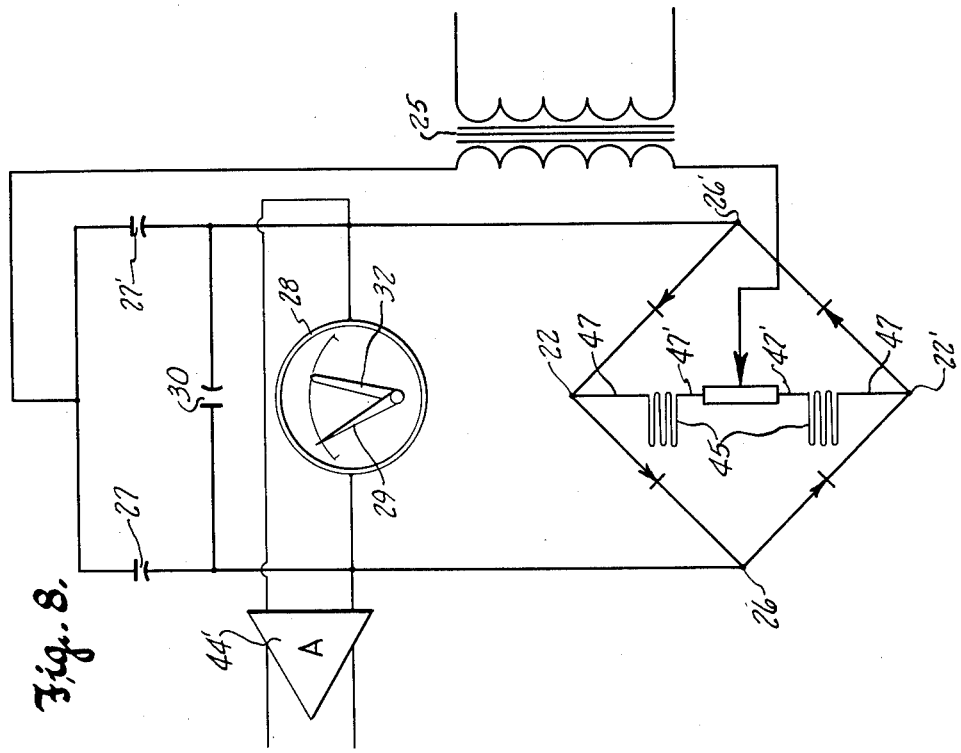
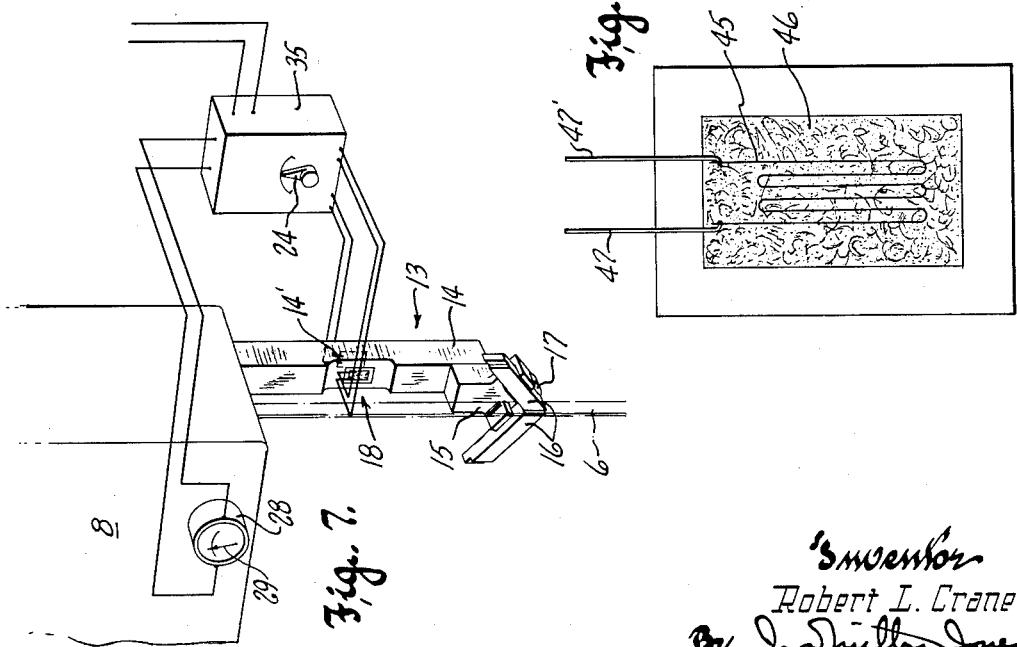
Inventor
Robert L. Crane
By Ira Milton Jones
Attorney

United States Patent Office 2,754,567
Patented July 17, 1956

2,754,567

AUTOMATIC FEED CONTROL APPARATUS FOR MACHINE TOOLS

Robert L. Crane, Glen Lake, Minn., assignor to Continental Machines, Inc., Savage, Minn., a corporation of Minnesota Application July 30, 1953, Serial No. 371,302

1 Claim. (Cl. 29—68)

This invention relates to machine tools and refers more particularly to metal cutting band saws wherein work mounted upon a supporting table is fed against a saw band constrained to downward travel through an opening in the table.

As is customary in machine tools of this type, and especially the larger capacity tools, power means are generally provided to advance the work supporting table and thereby feed the work to the saw band. One such power driven work feeding means is illustrated in Patent No. 2,625,965 issued January 20, 1953, to Continental Machines, Inc.

Manual control of the power driven work feed is generally provided but even skilled operators have found it difficult in the past to maintain the most efficient and effective rate of work feed. Obviously the rate of feed must not be excessive for this places an undue load upon the saw band, often resulting in breakage of the band and untimely wearing of its cutting edge; and less than the correct rate of work feed fails to take full advantage of the capacity of the machine.

The present invention has as its purpose to correct this situation through the provision of an automatic control for the power driven work feeding means governed by the strain imposed upon the saw band by the thrust of the work thereagainst. To this end the invention utilizes a strain gage which may be of the resistance type disclosed in Patent No. 2,292,549 issued to E. M. Simmons on August 11, 1942, and marketed by the Baldwin Locomotive Works or the electromagnetic type placed upon the market by the General Electric Company. In both types electric circuit controlling means responds to the strain detected by the strain gage in the part upon which it is mounted to proportionally alter the constants of an electric circuit with which the strain gage is connected.

The Baldwin Locomotive strain gage described in the aforesaid patent operates upon the well-known principle that the electrical resistance of materials varies with the strain thereof, and accordingly the essential element of that type of strain gage is a length of fine resistance wire so mounted and arranged that the strain being measured increases or decreases the tension upon the wire.

The General Electric strain gage is electromagnetic and effects its control by varying the impedance of a coil through changes in the magnetic reluctance of its flux path resulting from the air increases or decrease in an air gap between two opposing poles.

More specifically, therefore, this invention has as its object to provide a machine tool and especially a metal cutting band saw or filing machine, wherein the rate of work feed produced by some automatic mechanism powered by a suitable prime mover which may be either an electric or a hydraulic motor of variable or fixed speed, is governed by the strain upon the cutting tool to thereby assure an optimum work feed rate.

Another object of this invention resides in the combination with a band saw having a backup post which carries the thrust of the work against the saw band of a strain gage mounted directly on the backup post and a control circuit governed by the strain gage and operable to control the advance of the work supporting table.

With the above and other objects in view, which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate several complete examples of the physical embodiments of the invention constructed according to the best modes so far devised for the practical application of the principles thereof, and in which:

Figure 1 is a perspective view, more or less diagrammatically illustrating a metal cutting band saw equipped with a hydraulically powered work table feeding mechanism, and illustrating one application of this invention;

Figure 2 is a circuit diagram of the control employed in the Figure 1 embodiment of the invention;

Figure 5 is an enlarged detail view illustrating particularly the saw band backup and the manner in which the General Electric type of strain gage is mounted upon the backup post;

Figure 6 is a diagrammatic view illustrating the manner in which a strain gage mounted upon the backup support may be employed to govern the speed of a variable speed prime mover and thereby automatically coordinate the rate of work feed with the strain imposed upon the saw band by the work;

Figure 7 is a fragmentary view of a band saw showing particularly the manner in which the Baldwin Locomotive type of strain gage is mounted upon the backup post;

Figure 8 is a circuit diagram illustrating the manner in which the Baldwin Locomotive type strain gage is employed; and Figure 9 is a plan view of the Baldwin Locomotive type strain gage.

Figure 4:
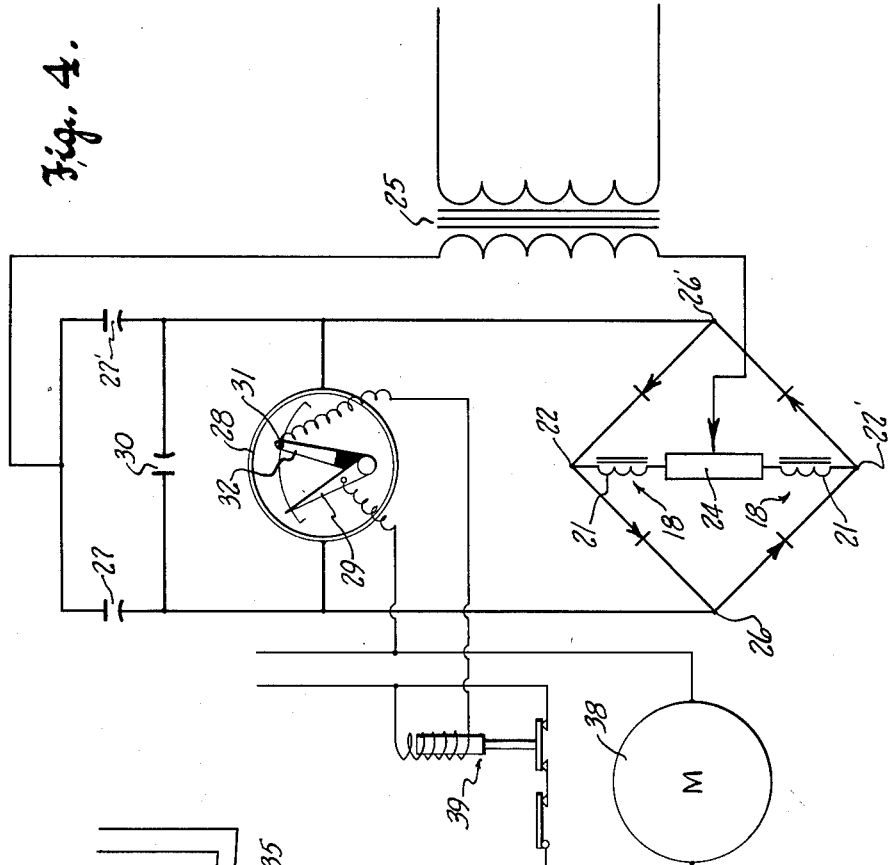
Figure 4 is a circuit diagram of the control employed in the Figure 3 embodiment of the invention.

Referring now particularly to the accompanying drawings in which like numerals indicate like parts throughout the several views, the numeral 5 designates the frame of a metal cutting band saw of the type wherein an endless flexible saw band 6 is trained over pulleys, not shown, mounted in the base 7 and head 8 of the frame to have one stretch of the band travel downwardly in a straight line through a slot 9 in a work supporting table 10.

The table 10 is mounted for rectilinear motion in a direction parallel with its slot 9 to feed work mounted on the table against the edge of the saw band. In that form of the invention shown in Figure 1 such advance of the table is effected hydraulically as for instance in the manner illustrated in Patent No. 2,625,965, and wherein the ram 11 of a hydraulic cylinder 12 is connected to the table so that the table partakes of the in and out movement of the ram produced by hydraulic fluid under pressure fed into one end or the other of the cylinder 12.

The saw band is supported against the thrust of the work thereon by a backup support indicated generally by the numeral 13. This backup support includes a stiff post 14 rigidly mounted in the head 8 of the machine for vertical adjustment to enable its lower end which carries a saw guide 15 to be brought down close to the work on the table. The saw guide 15 is preferably of the type forming the subject matter of Patent No. 2,311,426 issued to L. A. Wilkie February 16, 1943. Accordingly, the saw guide comprises a pair of angularly disposed guide bars 16 between which the saw band travels and a roller 17 mounted with its axis to one side of the path of the saw band and its front face in position to have the back edge of the band ride thereon.

Though perhaps not perceptible to the naked eye the thrust imposed upon the saw band by the work and transferred to the post 14 by the roller 17 deflects the post from its truly vertical condition and actually bends the same, despite the fact that it is quite heavy and fully capable of withstanding any normal work feeding pressure that could be imposed upon the saw band. This minute deflection of the backup post constitutes a measure of the strain imposed upon the saw band and is employed to control the advance of the power driven table. For this purpose a strain gage indicated generally by the numeral 18 is mounted on the post, and the response of its sensitive element to flexure of the post is utilized through suitable circuits about to be described to control a solenoid valve 19 (in the Figure 1 embodiment of the invention) connected in the feed line leading to the hydraulic clinder 12.

The post 14 is preferably weakened by reducing its thickness as at 14' for a length slightly greater than that required to accommodate the strain gage. This increases the flexure of the portion of the post upon which the strain gage is mounted. It is also preferable to employ two strain gages mounted back-to-back on the front and back faces of the post as best shown in Figure 5. The sensitive elements of both strain gages are fed into the same control circuit so that the net result is a straight line response as distinguished from the non-uniform response which would result from comparing the output of a single strain gage mounted upon the post 14 with the output of a comparison strain gage mounted at some remote point and not affected by flexure of the post.

In the General Electric type of strain gage (which is the one shown in Figure 5) there are two magnetic poles 20—20', both rigidly bolted to the post 14 with an air gap therebetween, and one of these two poles has a coil 21 mounted thereon. As the air gap between the poles changes the coil impedance changes, and by mounting two strain gages back-to-back in the manner shown, rearward deflection or bending of the post 14 as the result of the thrust of the work against the saw band increases the impedance of one of the coils and decreases the impedance of the other.

Although the specific circuit arrangement by which the output of the gages is employed to control the valve 19 is subject to modification, the circuit illustrated in Figure 2 shows one manner of securing the desired result. As here shown the coils 21 of the two strain gages are connected across opposite corners 22—22' of a rectifier bridge circuit 23 in series with the resistance element of a potentiometer 24, the slider of which is connected to one side of an A. C. power source provided by the secondary of a transformer 25. The other two corners 26—26' of the bridge are respectively connected through capacitors 27—27' with the opposite side of the transformer secondary. Preferably the transformer is of the voltage regulator type so as to minimize the effects of varying line voltage.

A suitable current responsive instrument 28 is connected across the corners 26—26' of the bridge to show, by the position of its pointer 29, any deviation from a predetermined relationship between the impedances of the coils of the two strain gages. The potentiometer 24 enables the bridge to be so balanced that when the strain on the backup support is zero the pointer 29 is at zero, indicating that the current flow during each half cycle through one of the capacitors 27—27', one leg of the rectifier and the coil of one of the strain gages is the same as that flowing through the other capacitor, another leg of the rectifier and the coil of the other strain gage.

As strain is applied upon the backup support the impedance of the coils of the strain gages changes and consequently there will be a different current flow through each of the capacitors 27—27' and a different voltage drop across each. The resulting voltage differential causes a current to flow through the instrument to swing its pointer 29 clockwise across it dial. A capacitor 30 connected across the corners 26—26' of the bridge smooths out the ripple of the D. C. output current.

As the pointer 29 swings across the face of its dial it approaches a contact 31 on an adjustable arm 32 and when it engages this contact an energizing circuit is completed for an electromagnet 33. Energization of the electromagnet closes a switch 34 and this in turn closes the circuit for the solenoid valve 19 to effect closure of the valve and cessation of work advancing movement of the table 10. By virtue of the adjustability of the contact carrying arm 32 the control can be adjusted to maintain an optimum work feed rate which, of course, is just below that at which the strain upon the saw band exceeds the critical value.

For convenience the instrument 28 is preferably mounted upon the head 8 of the machine, but the potentiometer 24 and the rectifiers of the bridge circuit are preferably mounted in a cabinet 35 which may be located wherever convenient.

Figure 3:
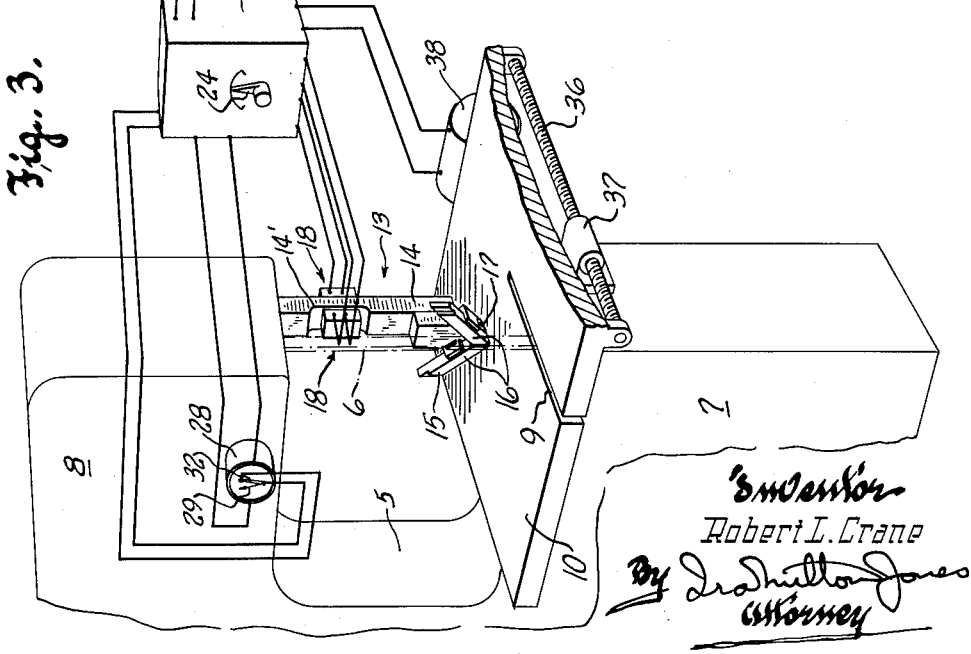
Figure 3 is a view similar to Figure 1 but illustrating a mechanical work table advancing means under the control of a strain gage responsive to the thrust of the work against the saw band.

In that form of the invention shown in Figure 3 the work advancing motion of the table is produced mechanically by a screw 36 carried by the table and threaded in a nut 37 which is fixed to the stationary base. The screw 36 is driven by an electric motor 38 which in turn is controlled by a circuit illustrated in Figure 4 and which is identical with that shown in Figure 2 except that in lieu of the electromagnet 33, the pointer 29 and contact 31 control energization of the coil of an electromagnetic switch 39. This switch controls the circuit for the motor 38 and when opened in response to the strain upon the backup post exceeding the predetermined maximum, stops the motor and interrupts work feeding advance of the table.

In those embodiments of the invention illustrated in Figures 1 to 4, inclusive, the work feeding advance of the table, unless interrupted in the manner described continues at a uniform rate; but in that embodiment of the invention shown in Figure 6 the rate of advance of the table varies with the strain upon the backup post. To this end a metering valve 40 is connected in the hydraulic line 41 leading to the cylinder 12.

The valve 40 is biased in one direction, and in the control shown, a spring 42 yieldingly urges it toward open position against the pull of an electromagnet 43. The coil of this electromagnet is adapted to be energized by the voltage across the instrument 28, suitably amplified by an amplifier 44. As the potential across the instrument 28 increases the voltage impressed upon the coil 43 by the amplifier 44 likewise increases and the valve 40 moves further toward closed position, it being understood that when the strain upon the saw band reaches the critical value the valve 40 will be fully closed and advance of the work will be interrupted until the strain upon the saw band is again less than critical. This embodiment of the invention has the advantage of assuring smoother control and avoiding sudden starting and stopping of the work feed, but of course requires the table advancing mechanism to be powered by a variable speed prime mover.

As hereinbefore pointed out, the invention is not dependent upon the use of any one specific form of strain gage. In the embodiments shown in Figures 1 to 6, inclusive, the gage is of the G. E. electromagnetic type wherein changes in the impedance of a coil initiate the desired response. In Figures 7 to 9, inclusive, the strain gage is of the resistance type placed upon the market by the Baldwin Locomotive Works and covered by the aforesaid Patent No. 2,292,549. In this case the strain gage consists essentially of a length of resistance wire 45 generally arranged in serpentine fashion upon a suitable flexible backing 46 which may be bonded directly to the front and back surfaces of the backup post as shown in Figure 7.

The terminals 47—47' of each of these two strain gages are connected in the bridge circuit as shown in Figure 8 and the potential difference across the corners 26—26' of the bridge indicated on the instrument 28 is amplified by an amplifier 44'; the output of the amplifier being employed in any desired manner to control the work feeding advance of the table 10.

From the foregoing description taken in connection with the accompanying drawings, it will be readily apparent to those skilled in this art that this invention provides a practical way of automatically controlling the strain imposed upon the cutting element of a machine tool and particularly the band of a metal cutting band saw, and that by virtue of this automatic control, it is possible to operate the machine at its optimum rate of work feed.

It will also be readily apparent to those skilled in the art that while two specific forms of strain gages have been illustrated and described and several ways of utilizing these gages to control the work feed have been shown and described, other strain gages and other ways of utilizing their outputs to control work feed may be employed without deviating from the spirit of this invention.

What I claim as my invention is:

In combination: a lengthwise moving elongated saw member having teeth along one edge and a bearing surface along the other edge movable along a defined path; a work holding member adapted to hold work to be acted upon by the saw member; said members being relatively movable to effect work performing feed engagement between the saw member and work held by the other member; a deflectable backup having a part positioned to engage said bearing surface edge of the saw member to support the saw member against the thrust of the work thereon; a prime mover having a speed adjusting means; means connecting said prime mover with one of said members to effect said relative movement between the saw member and the work holding member; a power circuit including a strain sensitive element mounted upon the backup and operable by deflection of the backup to effect a change in the power output of said circuit in accordance with deflection which results from the pressure exerted on the backup in consequence of said work performing feed engagement between the saw member and the work; and means connecting the power output of said circuit to the speed adjusting means of said prime mover so that the strain sensitive element acts to govern the operation of the prime mover in accordance with said pressure produced deflection of the backup.

References Cited in the file of this patent

UNITED STATES PATENTS

| | | |
|---|---|---|
| 1,181,402 | Mershon | May 2, 1916 |
| 2,296,967 | Wilkie | Sept. 29, 1942 |
| 2,561,317 | Ruge | July 17, 1951 |
| 2,625,965 | Crane | Jan. 20, 1953 |